United States Patent
Rodrigues et al.

(10) Patent No.: US 7,032,214 B1
(45) Date of Patent: *Apr. 18, 2006

(54) PERFORMANCE MARKERS TO MEASURE PERFORMANCE OF FEATURES IN A PROGRAM

(75) Inventors: James P. Rodrigues, Redmond, WA (US); Suneetha Annangi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

This patent is subject to a terminal disclaimer.

(21) Appl. No.: 09/606,961

(22) Filed: Jun. 29, 2000

(51) Int. Cl.
*G06F 9/44* (2006.01)

(52) U.S. Cl. ...................... 717/130; 702/186

(58) Field of Classification Search ............... 717/124, 717/128, 130; 702/119, 123, 177, 178, 179, 702/182–187
See application file for complete search history.

(56) References Cited

U.S. PATENT DOCUMENTS

| | | | | |
|---|---|---|---|---|
| 5,265,254 A | * | 11/1993 | Blasciak et al. ............ 717/130 |
| 5,371,689 A | * | 12/1994 | Tatsuma ..................... 702/186 |
| 5,446,878 A | * | 8/1995 | Royal ............................ 714/1 |
| 5,471,614 A | | 11/1995 | Kakimoto ................... 702/187 |
| 5,710,724 A | * | 1/1998 | Burrows ..................... 717/130 |
| 5,950,003 A | * | 9/1999 | Kaneshiro et al. .......... 717/130 |
| 5,953,689 A | | 9/1999 | Hale et al. .................. 702/182 |
| 5,960,198 A | * | 9/1999 | Roediger et al. ........... 717/130 |
| 6,016,466 A | | 1/2000 | Guinther et al. ............ 702/187 |
| 6,076,050 A | | 6/2000 | Klein ......................... 702/187 |
| 6,118,940 A | | 9/2000 | Alexander et al. .......... 717/127 |
| 6,145,121 A | | 11/2000 | Levy et al. ................. 717/135 |
| 6,158,049 A | * | 12/2000 | Goodwin et al. ........... 717/158 |
| 6,189,022 B1 | | 2/2001 | Binns ......................... 709/100 |
| 6,189,142 B1 | | 2/2001 | Johnston et al. ............ 717/125 |
| 6,205,545 B1 | * | 3/2001 | Shah et al. ................. 712/237 |
| 6,233,531 B1 | | 5/2001 | Klassen et al. ............... 702/80 |
| 6,247,170 B1 | | 6/2001 | Giroux ....................... 717/131 |
| 6,260,113 B1 | | 7/2001 | Cherian et al. ............. 717/125 |
| 6,282,701 B1 | | 8/2001 | Wygodny et al. ........... 717/125 |
| 6,349,406 B1 | | 2/2002 | Levine et al. ............... 717/128 |
| 6,658,471 B1 | * | 12/2003 | Berry et al. ................ 717/140 |

OTHER PUBLICATIONS

Gross, O., *Gamasutra*, "Pentium III Prefetch Optimizations Using the Vtune Performance Analyzer", vol. 3: Issue 28 (Jul. 30, 1999) (4 Parts—13 pages).

"Vtune™ Performance Enhancement Environment", Version 4.5, Product Overview, Intel, pp 1-10, (Feb. 2000).

* cited by examiner

*Primary Examiner*—Tuan Dam
*Assistant Examiner*—Eric B. Kiss
(74) *Attorney, Agent, or Firm*—Merchant & Gould P.C.

(57) ABSTRACT

A method, apparatus, and article of manufacture provide a mechanism for inserting performance code markers into programs to obtain and provide data regarding the run-time operation of the programs. The computing system has an init module, a performance code marker module for obtaining and storing the run-time internal state data for later retrieval, and an uninit module. The init module is executed before any run-time internal state data is collected. The performance code marker module is executed each time run-time internal state data is to be collected. The uninit module is executed after all run-time internal state data desired has been collected.

27 Claims, 8 Drawing Sheets

```
   521   522      523                            524
     1    8    206994621185796          206994621186415
     1    9    206994621186607          206994621186816
     1    4    206994614902758          206994621187365      502
     1    5    206994621186972          206994621187586
     1  501    206994692692884          206994692694188
     1    6    206995418775616          206995418776757
     1    3    000000000000300          206995418832491
     1    7    206995419948783          206995419948783
    50  500    206994607250814          206994607250814
     0    2    206995433571294          000000000000000
```

PERFORMANCE MARKERS TO MEASURE PERFORMANCE OF FEATURES IN A PROGRAM

RELATED APPLICATIONS

The instant application is related to two concurrently assigned and concurrently filed U.S. patent applications, PERFORMANCE MARKERS TO MEASURE BENCHMARK TIMING OF FEATURES IN A PROGRAM, Ser. No. 09/606,925, filed Jun. 29, 2000, and PERFORMANCE MARK TO MEASURE BENCHMARK TIMING OF A PLURALITY OF STANDARD FEATURES IN AN APPLICATION PROGRAM, Ser. No. 09/606,896, now U.S. Pat. No. 6,754,612, filed on Jun. 29, 2000.

TECHNICAL FIELD

This application relates in general to a method, apparatus, and article of manufacture for providing performance markers, also generically referred to as code markers, for testing of applications, and more particularly to a method, apparatus, and article of manufacture for inserting performance markers into programs to obtain and provide data regarding the run-time operation of the programs.

BACKGROUND OF THE INVENTION

One problem facing application program developers is how their application programs are to be tested. In order for the developers to test these programs, the developers need access to runtime state information regarding the internal operation of the program. This data can include memory usage, memory location contents, timing measurements for the execution of portions of the program, and similar data related to the state of the program while executing.

In the past, application developers have needed to use third party tools to re-instrument the target application (an example of this being post linker tools like Profilers which modify the application for the purpose of adding measurement code) with instructions that maintain and store the needed state data in locations that provide access by the developers. In doing this, the application developers are changing the application program being developed by artificially inserting this additional code. This insertion of code implies that the application developers are actually testing a program which is different from the application program which is ultimately delivered to end users. These differences caused by the insertion of this test code may or may not affect the ability of a programmer to adequately test the application program in an environment as close to the end user's working environment as possible. Additionally, the location of these insertion points is quite often limited to function call boundaries increasing the granularity at which the timings can be taken. This limits the precision of the measurements.

This situation is especially acute to benchmark testing in which the developer wishes to measure the time the application program requires to perform a certain code block of functionality. In benchmarking, the insertion of extra instructions related to the collection of internal data causes the application program to perform additional instructions not included in the final application program version. These additional instructions would, in fact, be part of the instructions executed during benchmark testing of the program used for this testing. As a result, current benchmark testing is inherently inaccurate in that the tested program is not the actual program delivered to end users.

There is also a non-insertion method by which developers perform benchmarking. Currently, the non-insertion techniques used by developers who attempt to perform benchmark testing include a variety of methods that estimate when the program reaches the desired target points within the code. These external techniques include visually detecting a display of events that occur on the computers monitor. Often these methods also include attempting to synchronize the operation of the application program with a test control program also running on the computer. The control program performs the timing measurement and tries to externally determine via the visual cues, call backs, or events detectable via the message queue when to stop the timing. This technique has a low level of accuracy due to the control program essentially estimating when to start and/or stop the timings. It is limited to the granularity of measurement achievable via the visual cues as well as the inconsistent time occurring between the control program registering the start timing and the invocation of the user interface or programmatic interface action which begins the functionality to be timed. Additionally, the use of this external test control program also changes the testing environment for the application program in that a second process is concurrently running with the application program being tested. This second program or process is consuming computer resources such as processing time and memory. As a result, any results obtained using this method does not accurately represent the results which occurred in the final version of the application program run within a typical user's working environment. To avoid the overhead of the control program, the timings are sometimes performed by use of a stop watch but this adds an inconsistent and non-negligible overhead both in the starting and the stopping of the timings, and also relies on visual cues making it inherently inaccurate.

Application developers are in need of a mechanism to insert permanent target points to application programs in a manner which does not significantly increase the overhead requirements for the application program while still providing the developers with a mechanism to collect and report the internal operating state data for the application program at precise intervals. In addition, application developers need a mechanism by which this testing process may be easily enabled, disabled, and configured to perform a large variety of different tests.

SUMMARY OF THE INVENTION

In accordance with the present invention, the above and other problems are solved by providing a method, apparatus, and article of manufacture for inserting performance markers, also referred to as code markers, into programs to obtain and provide data regarding the run-time operation of the programs.

One aspect of the present invention is a computing system for obtaining run-time internal state data within an application program. The computing system has an init module for determining if the run-time internal state data is to be collected during the operation of the application program, a performance marker module for obtaining and storing the run-time internal state data for later retrieval, and an uninit module for formatting and storing the obtained run-time internal state data into memory that permits retrieval after the termination of the application program. The init module is executed before any run-time internal state data is collected. The performance marker module is executed each time run-time internal state data is to be collected. The uninit module is executed after all run-time internal state data desired has been collected and just before the application exits.

Another such aspect is a method for obtaining run-time internal state data within an application program. The method inserts one or more performance markers into the application program at locations within the application program corresponding to the point at which run-time internal state data is desired and determines if run-time internal state data is to be collected at each code marker by checking for the existence of processing modules identified by an identification key within a system registry. If run-time internal state data is to be collected at each code marker, the computer process generates a performance data record containing the collected run-time internal state data each time the code markers are reached, stores the performance data records within a data memory block within the processing modules identified by the identification key within the system registry, and retrieves the performance data records from the data memory block for transfer to a mass storage device once all of the run-time internal state data has been collected.

Yet another aspect of the present invention is a computer data product readable by a computing system and encoding a computer program of instructions for executing a computer process for obtaining run-time internal state data within an application program. The computer process performs the operations required to insert one or more code markers into the application program at locations within the application program corresponding to the point at which run-time internal state data is desired and determine if run-time internal state data is to be collected at each code marker. If run-time internal state data is to be collected at each code marker, the computer process also generates a performance data record containing the collected run-time internal state data each time the code markers are reached, storing the performance data records within a data memory block, and retrieving the performance data records from the data memory block for transfer to a mass storage device once all of the run-time internal state data has been collected.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

The great utility of the invention is that it provides application program developers with a mechanism for inserting performance code markers into programs to obtain and provide data regarding the run-time operation of the programs. These and various other features as well as advantages, which characterize the present invention, will be apparent from a reading of the following detailed description and a review of the associated drawings.

BRIEF DESCRIPTION OF THE DRAWINGS

Referring now to the drawings in which like reference numbers represent corresponding parts throughout.

DETAILED DESCRIPTION OF THE INVENTION

This application refers to a method, apparatus, and article of manufacture for inserting code markers into programs to obtain and provide data regarding the run-time operation of the programs.

Figure 1:
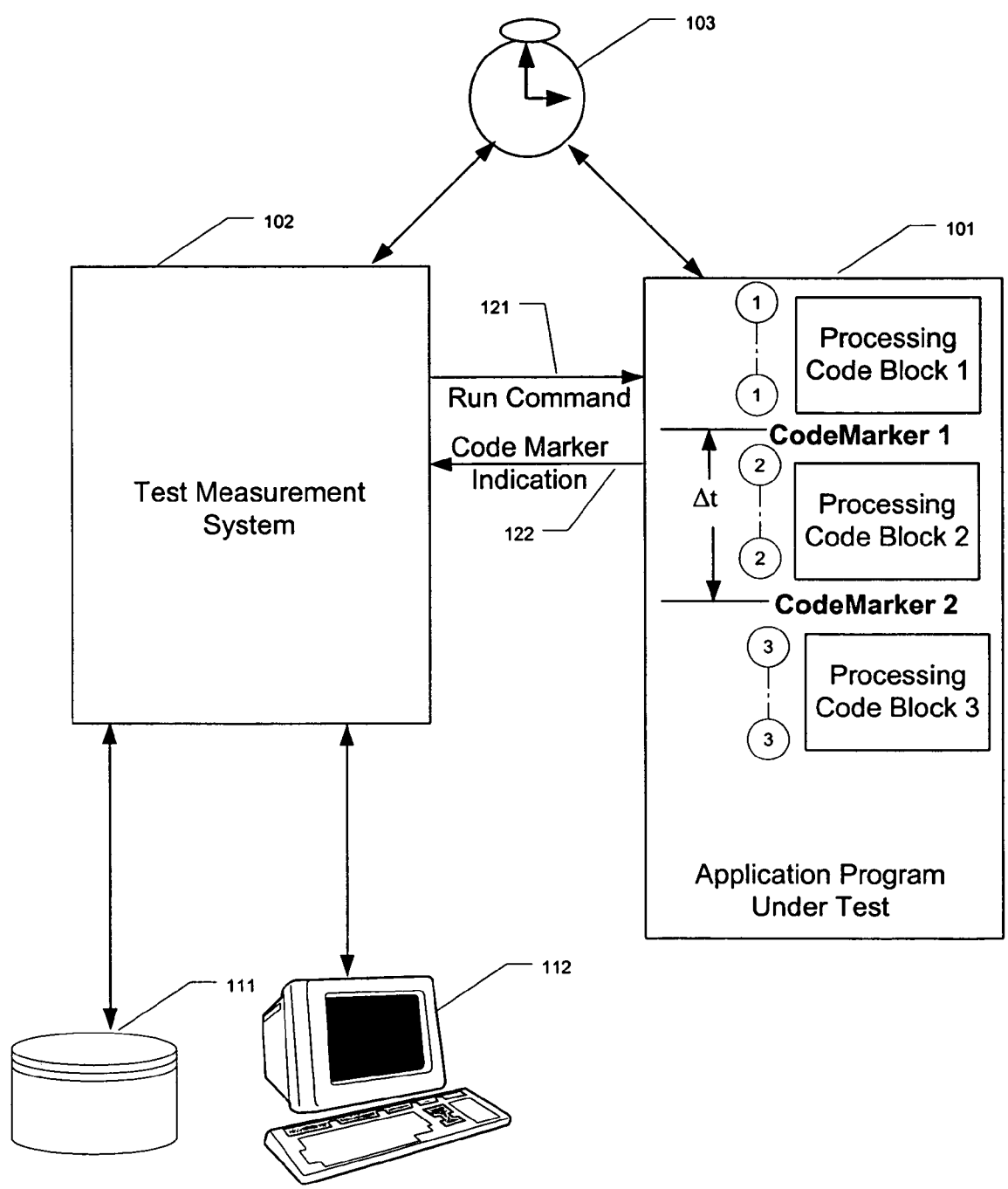
FIG. 1 illustrates an application program testing system according to one embodiment of the present invention.

FIG. 1 illustrates an application program testing system according to one embodiment of the present invention. Typically, when an application program 101 is being tested, the application program 101 interacts with a test measurement system 102 in order to control the operation of the application program 101 during the test. The test measurement system 102 transmits a run command 121 to the application program being tested 101 to instruct the program 101 to begin its operations. A user typically has inserted one are more code markers within the application program 101 to indicate the points during the operation of the application program 101 in which runtime data is desired. When the operation of the application program 101 reaches a code marker, a code marker indication 122 is transmitted to the test measurement system 102.

The test measurement system 102 uses the receipt of a code marker indication 122 as an indication that the application program 101 has reached one of the previously defined code markers. At this point time, the test measurement system 102 may obtain runtime data from the application program 101 for storage within a memory buffer, storage within a mass storage device 111, or display upon a user's terminal 112. If the test measurement system 102 wishes to obtain timing information regarding how long it particular operation within the application program 101 takes to perform, the test measurement system 102 may obtain a time stamp for a first code marker from a timing device 103. If time stamps are obtained by the test measurement system 102 at the beginning and end of a desired operation, the test measurement system 102 may determine how long it took for an application program 101 to perform the operation simply by comparing the difference between the two times.

Other performance measurements may be obtained in a similar manner to the timing measurements discussed above by obtaining run-time state data, such as the registry transactions, all file I/O transactions that occur including read operations, write operations, and delete operations to a given file, and similar useful system test data at the various code markers. Comparisons of the states of the program 101 at the code markers allows a user to determine what processes occurred between any two user defined code markers set within the program 101.

Figure 2:
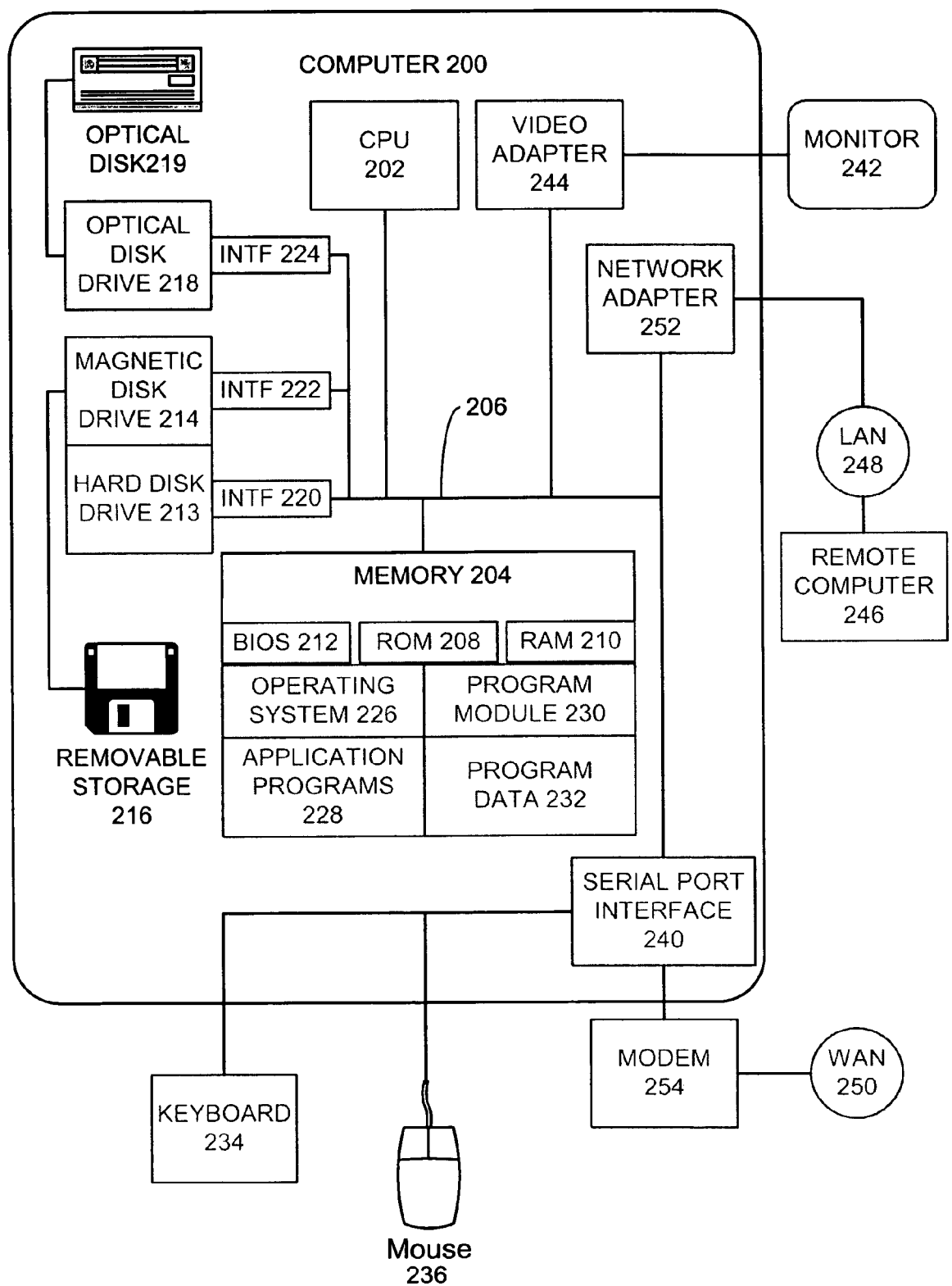
FIG. 2 illustrates a general purpose computing system for use in implementing as one or more computing embodiments of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 213 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 213, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
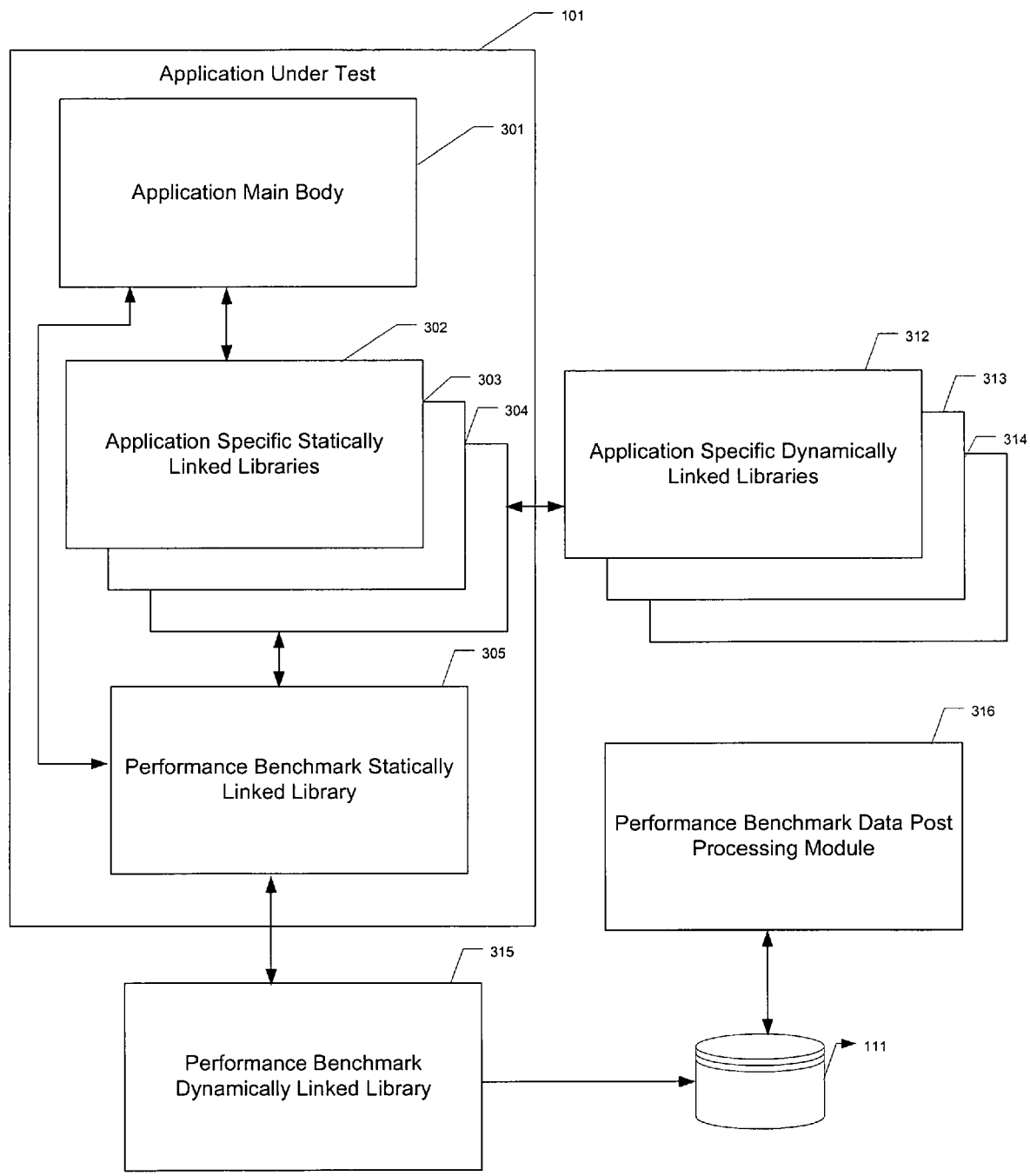
FIG. 3 illustrates another application program testing system according to another embodiment of the present invention.

FIG. 3 illustrates another application program testing system according to another embodiment of the present invention. Application program being test of 101 consists of an application main body module 301, one or more application specifically defined statically linked libraries 302–304, one more application specifically defined dynamically linked libraries 312–314, a performance benchmark statically linked library 305, and a performance benchmark dynamically linked library 315. In the past, application programs typically consisted of all the above modules with the exception of the performance benchmark statically linked library 305 and the performance benchmark dynamically linked library 315. An application developer who writes the application program 101 has specified a collection of processing modules which there may not be organized into the various libraries. These modules are combined together to create the application program 101 that the application developer wishes to test.

The application developer tests the operation of the application program 101 by inserting within any of the application specific modules 301–304 and 312–314 one or more code markers. These code markers comprise of function calls to modules within the performance benchmark statically linked library 305. The functionality which is to be performed at the particular code marker is implemented within these function calls. This functionality may be located within either the performance benchmark statically linked library 305 or the performance benchmark dynamically linked library 315.

The runtime data that the application developer wishes to obtain at each of these code markers is stored within the mass storage device 111 and and may be examined and further processed within a performance benchmark data post processing module 316. In order to minimize the runtime overhead associated with the implementation of the processing for a given code marker, the data collected at a particular code marker is stored within memory of the performance benchmark dynamically linked library 315 and ultimately transferred to the mass storage device 111. Processing of the data collected and displaying data to an application developer performing a test, is performed by the performance benchmark data post processing modules 316. By performing the performance data analysis processing end data display functions within a data post processing module 316, the amount of processing performed at runtime to implement a code marker is minimized.

Figure 4:
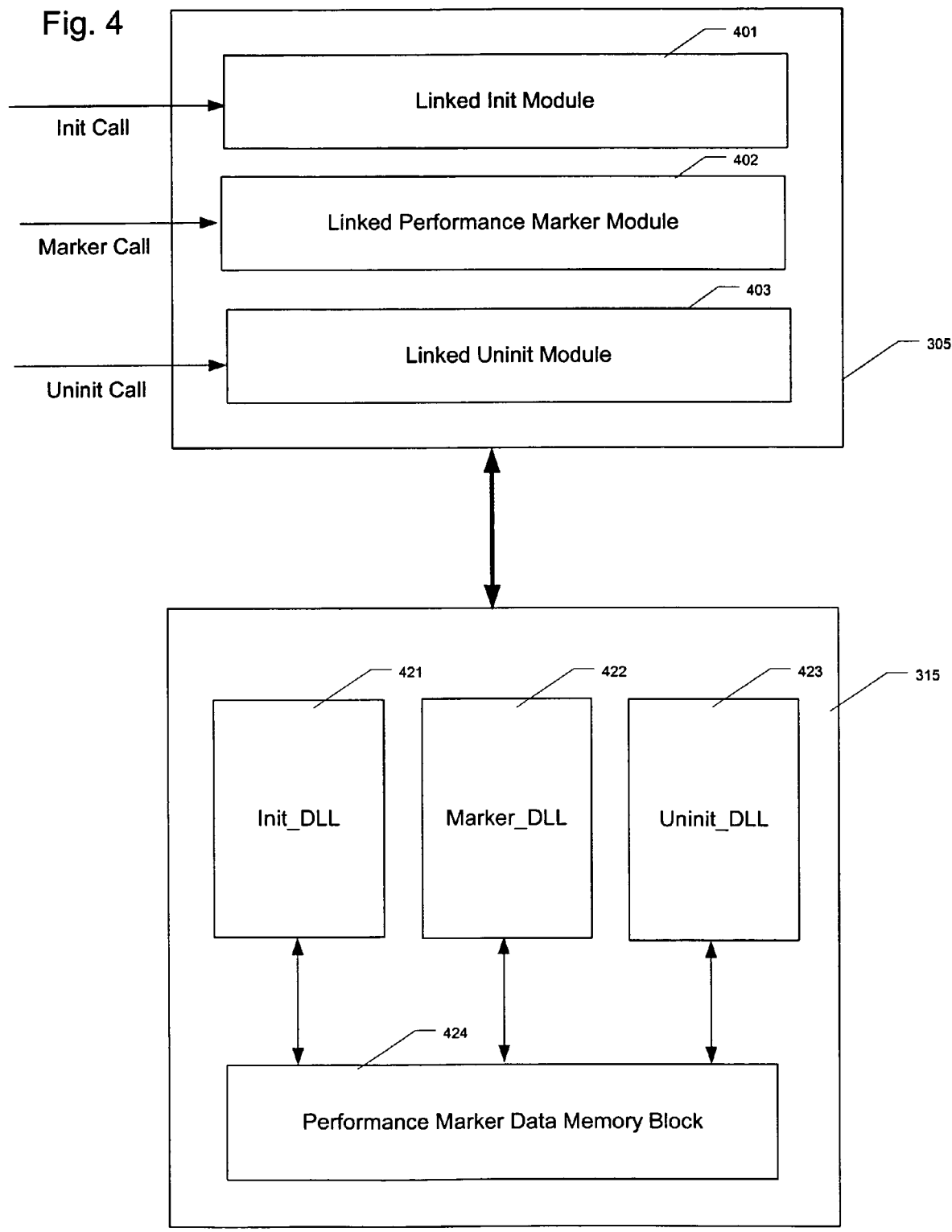
FIG. 4 illustrates a performance benchmark statically linked library and a performance benchmark dynamically linked library for use in program testing according to an example embodiment of the present invention.

FIG. 4 illustrates a performance benchmark statically linked library 305 and a performance benchmark dynamically linked library 315 for use in program testing according to an example embodiment of the present invention. The performance benchmark statically linked library 305 and the performance benchmark dynamically linked library 315 implement the functionality needed to insert performance data collection within an application program 101. The performance benchmark statically linked library 305 comprises of three modules: an Init module 401, a code marker module 402, and an unInit module 403. The Init module 401 is called once at the beginning of the application program 101 that is being tested. The code marker module 402 is called each time a code marker inserted within the application program 101 is reached. Finally, the unInit module 403 is called once at the end of the execution of the application program 101 to complete the data collection process and transfer the collected data to the mass storage device.

Within each of the three functions within the performance benchmark library 305, the processing simply includes a function call to corresponding dynamically linked libraries (DLL) within the performance benchmark dynamically linked library 315. With such an arrangement, a single performance benchmark statically linked library 305 may be statically linked within an application program 101, and may be small in size, while permitting the particular functionality to be performed within a benchmark test to be defined within the dynamically linked libraries. As such, a single mechanism may be used within an application program 101 that easily allows a plurality of different tests to be performed simply by changing the identity of the performance benchmark dynamically linked library 315 that are used as part a single test. Since all these tests share the exact same code marker location, true apples to apples comparison of test results can be achieved. For example, a measurement of time between two code markers can be analyzed with the data corresponding to the test of file system usage between those exact same markers.

The linked Init module 401, when called at the beginning of application program 101, obtains the identity of the dynamically linked library to be used for a particular test. This identity of the dynamically linked library is typically stored within a registry key in the system registry of the computing system. If the registry key which identifies the dynamically linked library is not found within the registry, the linked init module 401 determines that any code marker points encountered are not to perform any processing. Therefore, an application program 101 may be shipped to an end user without the performance benchmark dynamically linked library 315, and the corresponding system registry entries, where any code markers inserted within the application program 101, will not result in the performance of any additional processing.

Within the linked init module 401, the processing also determines whether the dynamically linked library 315, which has been identified by a system registry key, actually exists on the computing system. If this dynamic link library does not exist even though a registry key exists, or if the dynamic link library corresponding to the registry key does not contain the expected functions, the Init function 401 also determines that the code marker processing is not to occur.

The linked code marker module 402, which is called each time a code marker is reached, simply checks to see if the linked Init module 401 determined that code marker processing is to occur. If this code marker processing is not to occur, the code marker module 402 merely returns to the calling application program 101. If the module 401 had determined that code marker processing is to occur, the code marker module 401 takes a timing measurement and then calls the marker DLL module 422 with this timing as an input parameter. The DLL module 422 may store this timing data or decide to collect some other required runtime state data and to store this runtime state data within a performance marker data memory block 424. By having the statically linked code marker module make a timing measurement and then pass that timing measurement into the DLL module 422, there is a minimal amount of time delay occurrence between when the developer has chosen to make the timing and when it actually occurs. There is thus only a small and negligible overhead that occurs due to the clock cycles involved in making a function call to the statically linked code marker module 402. The marker DLL module 422 generates a performance data record for each corresponding code marker called to the marker DLL 422. These performance data records are simply stored as a concatenated array of records within the memory block 424.

Once all the processing has been completed, the uninit module 403 is called. This module 403 also checks to determine if the Init module 401 has indicated that code marker processing is to occur. If this code marker processing is not to occur, the linked unInit module 404 simply returns to the application program 101. If the code marker processing is to occur, the linked uninit module 404 calls the corresponding uninit DLL function 423. The unInit DLL 423 function retrieves all of the performance data records from the memory block 424, formats them appropriately, and stores these records within the mass storage device 111. Once these records reach the mass storage device 111, further analysis, review, and subsequent processing may be performed by the application developer as needed.

Because the particular performance code marker process that is to occur during a giventest is implemented within the three DLL module 421–423, the performance benchmarks, the present invention is readily extensible in that a single yet simple interface to a data collection mechanism may be specified in which the particular nature of the test performed does not need a to be embedded in the application program 101. In fact, this processing is contained completely with the set of three DLL modules 421–423. Additionally, the overhead associated with performing the calls to the performance benchmark function within an application program may be minimized. This fact is further emphasized by including all of the state difference processing needed to determine how long a block of code requires for execution, and to determine which state variables have changed during the execution of a given segment of code, is performed by post processing of the set of performance data records.

Figures 5A, 5B:
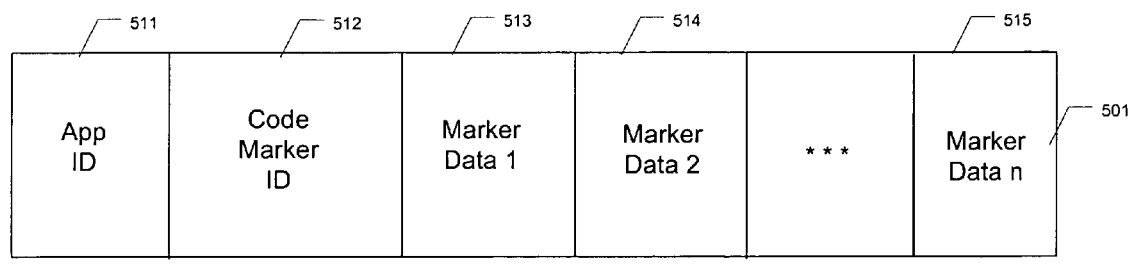
FIG. 5A illustrates a sample performance data record according to an embodiment of the present invention.
FIG. 5B illustrates a sample data file for a benchmark process according to an embodiment of the present invention.

FIG. 5A illustrates a sample performance data record according to an embodiment of the present invention. Each code marker with data record 501 comprises an plurality of data fields in used to represent the current state of an application program 101 at the time a code marker is reached. The record 501 includes an application identifier 511 that is used to identify uniquely the application program 101 from which the data record was generated. The record 501 includes a code marker Identifier 512 which is used to identify the particular code marker that generated this data record 501. Finally, the data record 501 includes one or more marker data fields 513–515 that records the current state data for the application program 101 at the time that the code marker was reached.

The above data record 501 may contain timing data such as a time stamp of the time at which the code marker was reached. The data record 501 may also contain an additional time stamp for the time in which the code marker processing returns from the DLL function 422 as a means to determine approximation for the overhead associated with the processing of the code marker data collection and storage operations. Other fields may include additional identifiers relating to the data being processed, a version of the application program being tested, and similar tests specific data that may be needed to analyze the performance data after the test is completed.

FIG. 5B illustrates a sample data file 502 for a benchmark process that determines the time required to perform various operations with an application program 101. Each data record comprises four fields: an AppID 521, a code marker ID 522, a time stamp for a code marker 523, and a time stamp for an overhead estimate 524. The time stamps in this illustrated embodiment may be obtained from a system timer/counter found within many computing systems. This system timer is related to the operating clocks used within a computing system and thus relates directly to the time, measuring clock cycles, required to reach a particular point in the execution of the program. As such, the difference between various time stamps, after subtracting any overhead time, would represent the amount of time, as measured in clocks cycles, needed too perform the processing between any two code markers.

Figure 6:
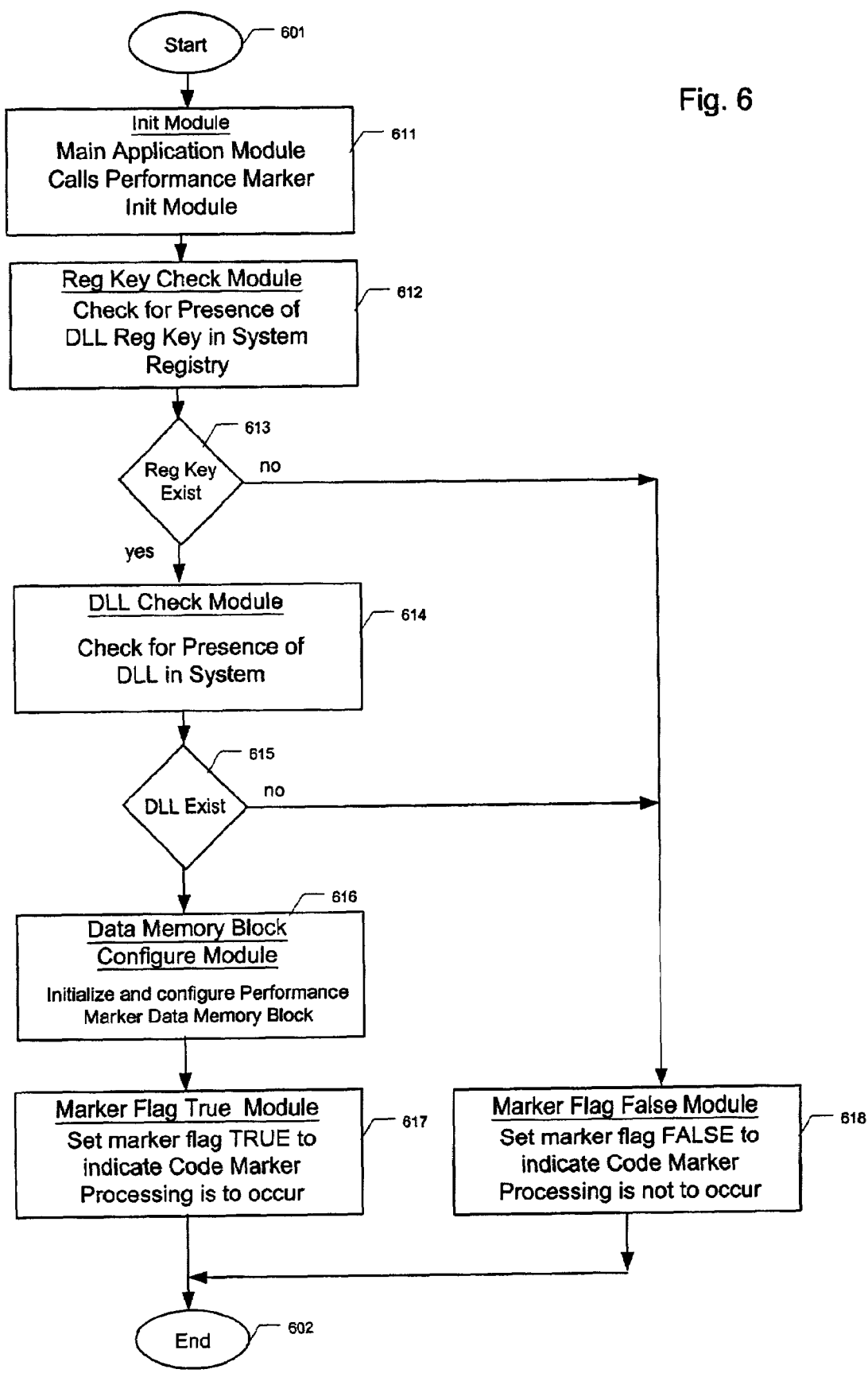
FIG. 6 illustrates an operational flow for an initialization module within a performance markers module according to an embodiment of the present invention.

FIG. 6 illustrates an operational flow for an initialization module within a performance markers module according to an embodiment of the present invention. The processing within the initialization process 601 proceeds to an Init module 611. Within the Init module 611, the main application module calls the performance marker init module 401. Inside, the processing proceeds to the Registry Key Check module 612. This module 612 checks a DLL registry key within a system registry on the computer. This registry key provides the identity of the dynamically linked library containing the processing modules needed to implement the code marker processing.

Test module 613 determines whether this registry key exists. If not, processing branches to a Marker Flag False module 618. If a registry key does exist, as determined by test module 613, processing proceeds to DLL check module 614. This module 614 checks for the presence of the DLL modules within the system as identified in by the previously checked registry key. This module 615 determines the outcome of the previous check for the existence of the DLL module. If the DLL module does not exist, processing again branches to Marker Flag False module 618.

If the DLL module identified by the registry key exists, processing branches to Data Memory Configuration module 616. This configuration module 616 initializes and configures a performance marker data memory block 424 within the DLL. This memory block is used to hold the collection of the performance data records generated by the performance benchmarking process. Once complete, the Flag Marker True module 617 sets a marker flag to be true. This flag is used by other processing the to indicate whether not a performance benchmark processing is to occur. Once this processing has completed, the processing ends 602.

Returning to either test operation 612, or 615, if either of these tests are determined to be false, and the processing proceeded to Marker Flag False module 618. This flag module 618 sets the marker flag to be false thus indicating that performance benchmark processing is not to occur because either the reg key that identifies the DLL to be used does not exist or the DLL, specified by the reg key value, doesn't exist. Once this flag is been set, the processing also ends 602.

Figure 7:
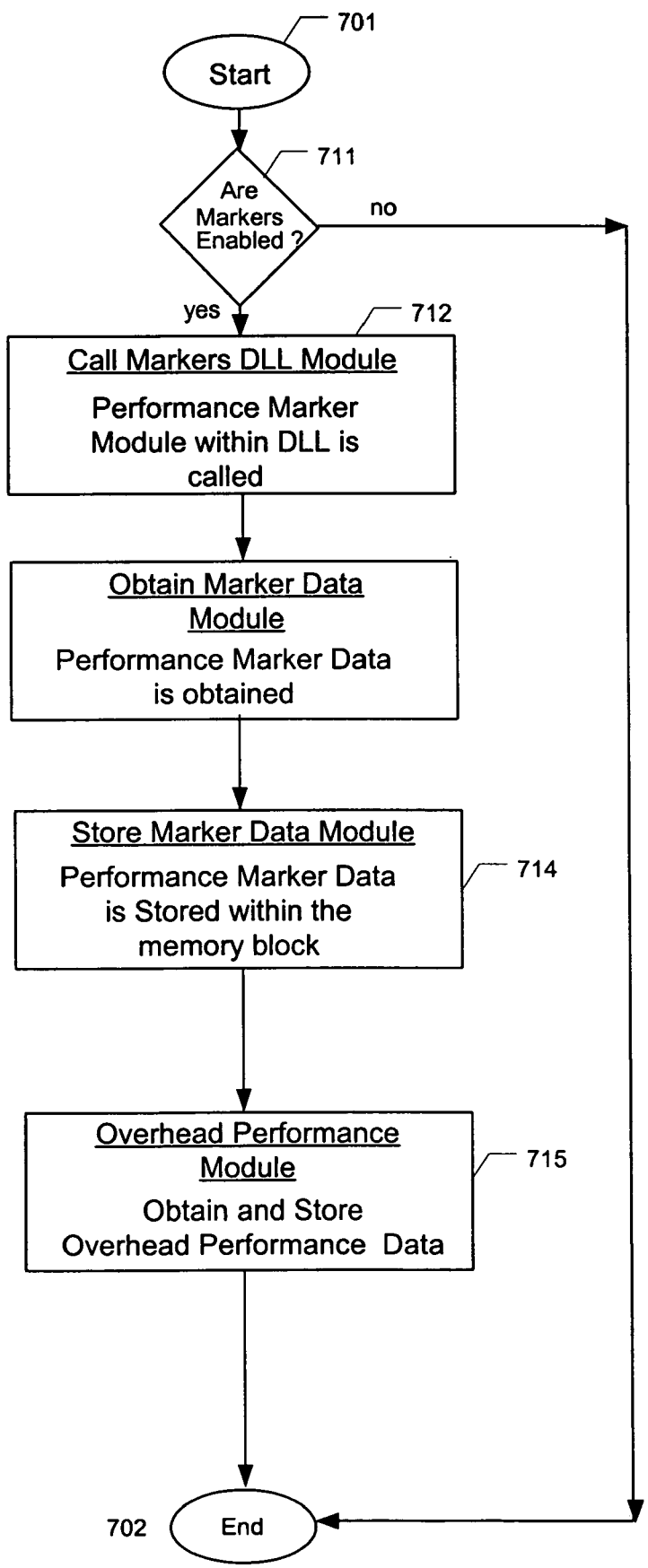
FIG. 7 an operational flow for a markers data module within a performance markers module according to another embodiment of the present invention.

FIG. 7 designates an operational flow for a markers data module within a performance markers module according to another embodiment of the present invention. Within the code marker processing, the processing starts 701 and tests module 711 immediately determines whether benchmark processing is to occur. This test checks the marker flag that has been previously set within the initialization process. If code marker processing is not to occur, processing merely branches to the end 702. As such code marker processing simply results in a function call which checks a flag and immediately returns back to main processing. As such, the overhead associated with the execution of an application program containing performance code markers is quite minimal. This low impact approach allows application programs to ship to the end user with the performance code markers intact and essentially dormant. This operation overhead processing has a negligible impact upon the performance of the application program itself while still providing an extensible means by which the testing of the application program may be performed.

If the flag indicates that performance benchmarks are to be processed, the statically linked library code marker function preferred implementation takes a hi-resolution timing 523 and proceeds to call the performance marker DLL module 712 passing this timing as a parameter. The timing is taken within the static link library so as to occur as near the point in the code at which the code marker was called as possible. The implementation of the code marker function in the DLL stores the performance data 714 and also takes and stores a second hi-resolution measurement 524. The purpose of this second measurement is to be able to determine and, during post-processing, subtract out any overhead time spent inside the DLL code marker function. As previously stated, the data may include a time stamp data, memory usage data, file open data, and similar measures of the current state and performance of the application program 101. In fact, an application developer may insert any functional code that he or she wishes to be performed at a particular point time during execution of the application program that using this procedure.

Store Marker Data Module 714 stores the previously obtained performance marker data within the performance marker data memory block 424. As part of this process, a performance data record is generated within a format desired for the particular data being collected. Once the data has been stored, an Overhead Performance module 715 may obtain and store overhead performance data needed to account for processing that occurs within the performance marker modules. As discussed above, the timing data typically includes a time stamp associated with the beginning of the code marker processing.

Because the above collection of modules that are needed to obtain the data, format the data, and store the data within the memory block 424 takes some measurable amount the processing time, as measured in clock cycles, to perform its operations, a more accurate estimate for a benchmark for the processing that occurs between two code markers would attempt to subtract the time spent within all of these benchmark modules. As such, this record may include a second time stamp associated with time at which the processing returns back to the main application. The second time stamp may be generated and stored within the memory block by the overhead Performance module 715. With all of the data now collected and stored within the memory block 424, the processing ends 702.

Figure 8:
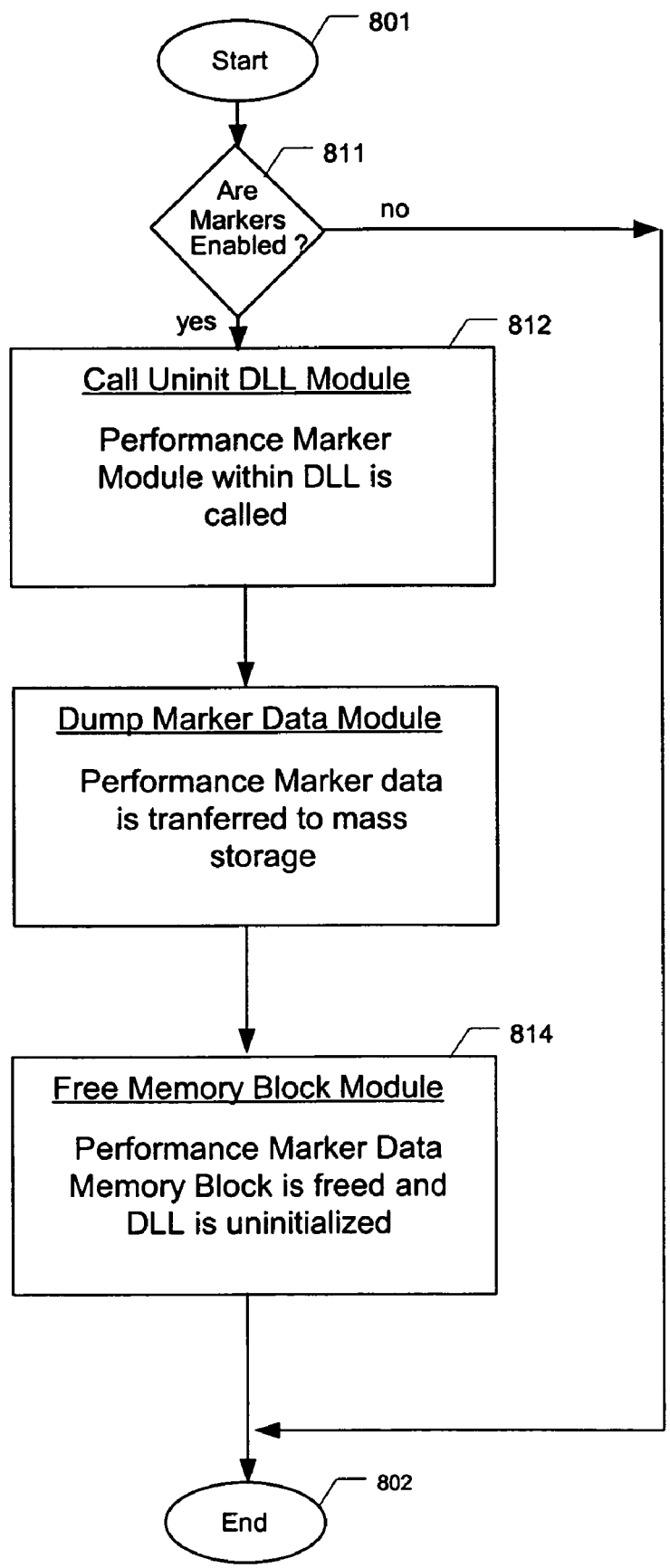
FIG. 8 an operational flow for an uninitalization module within a performance markers module according to another embodiment of the present invention.

FIG. 8 shows an operational flow for an uninitalization module within a performance markers module according to another embodiment of the present invention. Within the unInit processing, the processing starts 801 and tests module 811 immediately determines whether benchmark processing is to occur. In one embodiment, this test module 811 checks the marker flag that had been previously set within the initialization process. If the code marker processing is not to occur, the processing merely branches to the end 802. As such, the unInit processing simply results in a call to the linked library routine which checks a flag and immediately returns back to main processing. As discussed above, this sequence of operations imposes a minimal amount of processing upon an application program 101 when set to the end user without the performance marker DLLs.

If performance marker processing is to occur, then the processing proceeds from test operation 811 to a Call to unInit DLL module 812. This module 812, which is located within the static link library, calls the DLL module to move the collection of performance data records from the DLL memory block 424 to mass storage 111. Typically, these records are stored within a file in the computer's file system for later use. This data may be stored in either a binary format, or may be converted into a human readable form. Because the uninit process occurs at the end of the testing process, occurs only once, and occurs after all time critical events are over, this data conversion processing may occur within the DLL modules without affecting the results from the testing. Alternatively, this data formatting operation may occur within the post processing modules 316 at a later date. Once the data has been stored for later use, a Free Memory Block module 814 performs any system housekeeping processing necessary to free the memory used by the DLL modules that is no longer needed.

Thus, the present invention is presently embodied as a method, apparatus, computer storage medium or propagated signal containing a computer program for manufacture for inserting performance markers into programs to obtain and provide data regarding the run-time operation of the programs.

While the above embodiments of the present invention describe insertion of performance markers into programs to obtain and provide data regarding the run-time operation of the programs, one skilled in the area will recognize that the type of run-time data collected and returned to a user may represent any data collectable from the computing system and its operating state. As long as the code markers are inserted within the application program at the locations in which the testing is to occur, and as long as the particular data collection processing is specified within the libraries, the present invention would be useable in any testing environments. It is to be understood that other embodiments may be utilized and operational changes may be made without departing from the scope of the present invention.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for inserting code markers into programs to obtain and provide data regarding the run-time operation of the programs.

The invention claimed is:

1. A computing system for obtaining run-time internal state data within an application program, the computing system comprising: a processor unit;
   an init module for determining if the run-time internal state data is to be collected during the operation of the application program;
   a performance code marker module for obtaining and storing the run-time internal state data for later retrieval at predefined points corresponding to permanently inserted performance markers, wherein the application program calls the performance code marker module each time one of the permanently inserted performance markers is reached; and
   an uninit module for formatting and storing the obtained run-time internal state data into memory that permits retrieval after the termination of the application program;
   wherein
      the init module is executed before any run-time internal state data is collected;
      the performance code marker module is executed each time run-time internal state data is to be collected; and
      the uninit module is executed after all run-time internal state data desired has been collected.

2. The computing system according to claim 1, wherein the init module determines if run-time internal state data is to be collected.

3. The computing system according to claim 2, wherein init module makes the determination that run-time internal state data is to be collected by checking for the existence of an identification key within a system registry;
   the identification key uniquely identifies the processing modules to be used to collect, format, and store the run-time internal state data to be collected.

4. The computing system according to claim 3, wherein the init module further makes the determination that run-time internal state data is to be collected by checking for the existence of processing modules identified by the identification key within the system registry.

5. The computing system according to claim 2, wherein the performance code marker module collects run-time internal state data only if the init module has determined that the run-time internal state data is to be collected.

6. The computing system according to claim 5, wherein the performance code marker module generates a performance data record containing the collected rum-time internal state data each time the performance code marker module is executed.

7. The computing system according to claim 6, wherein the performance code marker module stores the performance data records within a data memory block within the processing modules identified by an identification key within a system registry.

8. The computing system according to claim 7, wherein the uninit module retrieves the performance data records from the data memory block for transfer to a mass storage device.

9. The computing system according to claim 8, wherein run-time internal state data comprises benchmark timing data related to the time at which a code marker is reached during the execution of the application program.

10. The computing system according to claim 9, wherein run-time internal state data comprises memory usage data related to the state of the memory used by the application program during the execution of the application program.

11. The computing system according to claim 9, wherein run-time internal state data comprises system registry usage data related to the system registry keys used by the application program during the execution of the application program.

12. The computing system according to claim 9, wherein run-time internal state data comprises open file usage data related to the state of the files that are currently open during the execution of the application program.

13. A method for obtaining run-time internal state data within an application program, the method comprising:
  permanently inserting one or more code markers into the application program at locations within the application program corresponding to the point at which run-time internal state data is desired;
  determining if run-time internal state data is to be collected at each code marker by calling a performance code marker module, the performance code marker module checking for the existence of processing modules identified by an identification key within a system registry;
  if run-time internal state data is to be collected at each code marker:
    generating a performance data record containing the collected run-time internal state data each time the code markers are reached;
    storing the performance data records within a data memory block within the processing modules identified by the identification key within the system registry;
  retrieving the performance data records from the data memory block for transfer to a mass storage device once all of the run-time internal state data has been collected.

14. The method according to claim 13, wherein run-time internal state data comprises benchmark timing data related to the time at which a code marker is reached during the execution of the application program.

15. The computing system according to claim 13, wherein run-time internal state data comprises memory usage data related to a state of the memory used by the application program during the execution of the application program.

16. The computing system according to claim 13, wherein run-time internal state data comprises system registry usage data related to system registry keys used by the application program during the execution of the application program.

17. The computing system according to claim 13, wherein run-time internal state data comprises open file usage data related to a state of the files that are currently open during the execution of the application program.

18. A computer storage medium readable by a computing system and encoding a computer program of instructions for executing a computer process for obtaining run-time internal state data within an application program, said computer process comprising the steps of:
  permanently inserting one or more code markers into the application program at locations within the application program corresponding to the point at which run-time internal state data is desired;
  determining if run-time internal state data is to be collected at each code marker by calling a performance code marker module;
  if run-time internal state data is to be collected at each code marker:
    generating a performance data record containing the collected run-time internal state data each time the code markers are reached;
    storing the performance data records within a data memory block;
    retrieving the performance data records from the data memory block for transfer to a mass storage device once all of the run-time internal state data has been collected.

19. The computer storage medium according to claim 18, wherein the determining step makes the determination that run-time internal state data is to be collected by checking for the existence of an identification key within a system registry;
  the identification key uniquely identifies the processing modules to be used to collect, format, and store the run-time internal state data to be collected.

20. The computer storage medium according to claim 19, wherein the determining step further makes the determination that run-time internal state data is to be collected by checking for the existence of processing modules identified by the identification key within the system registry.

21. The computer storage medium according to claim 19, wherein the data memory block is within the processing modules identified by the identification key within the system registry.

22. The computer storage medium according to claim 19, wherein run-time internal state data comprises benchmark timing data related to the time at which a code marker is reached during the execution of the application programs.

23. The computer storage medium according to claim 19, wherein run-time internal state data comprises memory usage data related to a state of the memory used by the application program during the execution of the application program.

24. The computer storage medium according to claim 19, wherein run-time internal state data comprises system registry usage data related to system registry keys used by the application program during the execution of the application program.

25. The computer storage medium according to claim 19, wherein run-time internal state data comprises open file usage data related to a state of the files that are currently open during the execution of the application program.

26. The computer storage medium according to claim 19, wherein the computer data product comprises a computer readable storage medium readable by a computer upon which encoded instructions used to implement the computer process are stored.

27. The computer storage medium according to claim 19, wherein the computer data product comprises a propagated signal on a carrier detectable by a computing system and encoding a computer program of instructions for executing the computer process.

* * * * *

UNITED STATES PATENT AND TRADEMARK OFFICE
CERTIFICATE OF CORRECTION

| | | |
|---|---|---|
| PATENT NO. | : 7,032,214 B1 | Page 1 of 1 |
| APPLICATION NO. | : 09/606961 | |
| DATED | : April 18, 2006 | |
| INVENTOR(S) | : James P. Rodrigues et al. | |

It is certified that error appears in the above-identified patent and that said Letters Patent is hereby corrected as shown below:

On the title page, item (56), under "Other Publications", in column 2, line 5, delete "pp" and insert -- pp. --, therefor.

In column 1, line 12, delete "MARK" and insert -- MARKERS --, therefor.

In column 4, line 22, delete "uninitalization" and insert -- uninitialization --, therefor.

In column 7, line 6, delete "and" before "may". (Second Occurrence)

In column 8, line 40, delete "uninit" and insert -- unInit --, therefor.

In column 8, line 47, delete "uninit" and insert -- unInit --, therefor.

In column 10, line 6, after "processing" delete "the".

In column 11, line 12, delete "uninitalization" and insert -- uninitialization --, therefor.

In column 12, line 60, in Claim 6, delete "rum-time" and insert -- run-time --, therefor.

In column 14, line 40, in Claim 22, after "application" delete "programs" and insert -- program --, therefor.

Signed and Sealed this

Thirtieth Day of March, 2010

David J. Kappos
*Director of the United States Patent and Trademark Office*